(12) United States Patent
Ehrman

(10) Patent No.: US 8,650,781 B1
(45) Date of Patent: Feb. 18, 2014

(54) UTILITY TRAILER LICENSE PLATE BRACKET

(76) Inventor: Sean R Ehrman, Cranberry Township, PA (US)

(*) Notice: Subject to any disclaimer, the term of this patent is extended or adjusted under 35 U.S.C. 154(b) by 618 days.

(21) Appl. No.: 12/587,532

(22) Filed: Oct. 7, 2009

(51) Int. Cl.
*G09F 7/00* (2006.01)
*B60Q 1/56* (2006.01)

(52) U.S. Cl.
USPC .............. 40/210; 40/200; 40/209; 362/473; 362/497

(58) Field of Classification Search
USPC .......... 248/309.1, 310, 311.2, 346.03, 346.5; 40/200, 201–210, 463, 591; 362/473, 362/497–498, 276, 588–590; 296/21; 280/656
See application file for complete search history.

(56) References Cited

U.S. PATENT DOCUMENTS

| | | | | |
|---|---|---|---|---|
| 1,887,087 A * | 11/1932 | Frizner | ............ | 40/209 |
| 5,150,960 A * | 9/1992 | Redick | ............ | 362/497 |
| 5,803,526 A * | 9/1998 | Rohrberg | ............ | 296/76 |
| 6,478,458 B2 * | 11/2002 | Hickman | ............ | 362/473 |
| 6,681,507 B1 * | 1/2004 | Lieziert | ............ | 40/209 |
| 6,799,877 B2 * | 10/2004 | Watkins et al. | ............ | 362/542 |
| 7,213,962 B2 * | 5/2007 | Chen | ............ | 362/497 |
| 7,347,017 B2 * | 3/2008 | Shaffer, Jr. | ............ | 40/591 |
| 7,543,842 B1 * | 6/2009 | Fiorini | ............ | 280/656 |

* cited by examiner

*Primary Examiner* — Tan Le
(74) *Attorney, Agent, or Firm* — Richard K Thomson

(57) ABSTRACT

The present invention is directed to a mounting bracket for the license plate of a utility trailer. Conventional mounts position the plate below the taillights where the plates are frequently bent by contact with the ground either during towing or manipulation by the tongue. The present lit bracket extends upwardly from the tail light holes, or alternatively affixes to the back gate of the utility trailer, to position the plate out of harm's way.

20 Claims, 5 Drawing Sheets

UTILITY TRAILER LICENSE PLATE BRACKET

BACKGROUND AND SUMMARY OF THE INVENTION

This application relates to license plate brackets, specifically to such brackets which are used on utility trailers.

Conventional mounts position the license plate below the tail lights, where the plates are frequently bent by contact with the ground either during towing, manipulation by the tongue, or tilting of the back of the trailer toward the ground.

A few types of brackets have been designed in an attempt to minimize damage caused by the license plate hitting an object while the trailer or other vehicle is moving at relatively low speed. U.S. Pat. No. 5,518,350 to Kyprios discloses a plate bracket that allows the plate to temporarily bend forward or backward if the plate strikes an obstacle or the ground. However, this bracket is only a halfway solution, because an object hitting the plate hard enough or from the wrong angle will still cause damage to the plate. In addition, the bracket contains numerous moving flexible parts that are subject to breakage and wear over time. Moreover, Kyprios' bracket is not useful in the common situation where the back end of the trailer pivots straight down, causing the bottom edge of the plate to hit the ground perpendicular or almost perpendicular to the plate.

A partial solution to this last problem is found in Ross, U.S. Pat. No. 4,413,803, which discloses a license plate bracket with a moving hinge on top and a roller positioned beneath the plate. Beyond this minor addition, however, Ross' bracket still contains the other flaws of Kyprios' bracket (e.g., moving parts, still subject to damage from high speeds or wrong angle), and contains the additional weakness of having a thin T-strip supporting the plate, thus making it even more susceptible to becoming twisted. Moreover, it is unlikely that Ross' bracket will cause the license plate to pivot away from the ground if the plate is directly perpendicular when contacting the ground.

It is an object of the present invention to provide a utility license plate bracket that avoids the above problems altogether, by placing the license plate up and out of harm's way, thereby eliminating the possibility that the license plate will hit obstacles or the ground while the utility trailer is in motion and/or tilted backwards. It is another object of the present invention to allow an electric light to become part of the license plate display, despite the license plate being positioned above and away from the tail light.

In the displayed embodiment, the license plate bracket comprises a bracket for mounting a license plate to a utility trailer, comprising: a) at least one sheet of rigid material; b) a means to secure the at least one sheet to a tail light holder of the utility trailer, and an alternative means to secure the at least one sheet to the back gate of the utility trailer; c) a means to secure the license plate to the at least one sheet, wherein the lowest horizontal edge of the license plate is positioned above the top horizontal edge of the tail light holder; and d) a means to secure an electric light to the at least one sheet, wherein the electric light is positioned approximately above the top edge of the license plate. It will be understood that the terms "rigid" and "semi-rigid" are used interchangeably herein.

The at least one sheet of rigid material in this first embodiment is secured to the tail light holder of the utility trailer. As an alternative means of fastening the bracket to the utility trailer, the at least one sheet can be secured directly to the back gate of the utility trailer.

In this embodiment, the means to secure the at least one sheet to the tail light holder comprises a first plurality of bracket holes which correspond spatially with a plurality of holes or bolts in the tail light holder. A fastener means extends through this first plurality of bracket holes and the plurality of holes in the tail light holder. Alternatively, the fastener means will secure to the tail light holder bolts that align with the first plurality of bracket holes. The means to secure the at least one sheet to the license plate comprises a second plurality of bracket holes which correspond spatially with a plurality of holes in the license plate, with the fastener means extending through the second plurality of bracket holes and plurality of holes in the license plate.

The displayed bracket further comprises a recessed channel to serve as a cover for an electric cord, with one end of the recessed channel terminating near the means to secure an electric light.

The displayed bracket further comprises multiple ridges of rigid material for support, wherein the ridges are approximately perpendicular to the face of the sheets and run approximately vertically on the face of the sheets. In this embodiment, the ridges are positioned on either side of the various bracket holes in order to protect the securing means. Two of the ridges also create a path for the electric cord light.

The bracket is wired with a quick disconnect adapter so that the bracket can be used in a tail light mounted position as well as a trailer tail gate mounted position. A wiring and mounting kit can be used to power and secure the bracket to the trailer tailgate using the original bracket.

Various other features, advantages and characteristics of the present invention will become apparent to one of ordinary skill in the art after a reading of the following specification.

BRIEF DESCRIPTION OF THE DRAWINGS

An embodiment of the present invention is described in conjunction with the associated drawings in which like features are indicated with like reference numerals and in which.

Figure 1:
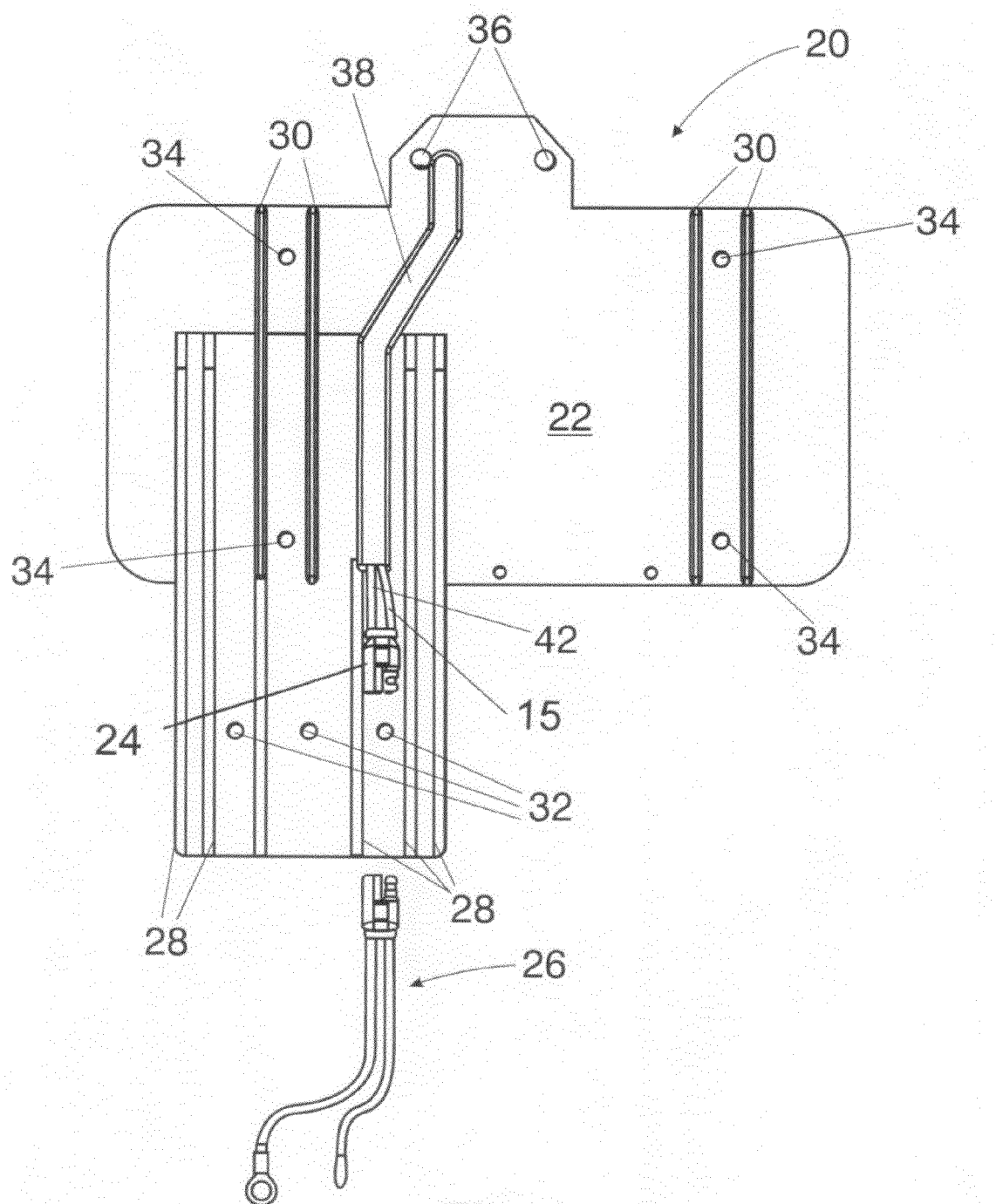
FIG. 1 is a rear view of a first embodiment the utility trailer license plate bracket of the present invention.

| Drawing Reference Numerals | |
|---|---|
| Bolts | 11 |
| Nuts | 12 |
| License Plate | 13 |
| Electric Light | 14 |
| Electric Cord | 15 |
| Tail Light Holder | 17 |
| Utility Trailer Gate | 18 |
| Utility Trailer | 19 |
| Bracket | 20 |
| Sheet | 22 |
| Quick Disconnect Adapter | 24 |
| Wire extender | 26 |
| First Supporting Ridges | 28 |
| Second Supporting Ridges | 30 |
| Tail Light Holder Securing Holes | 32 |
| License Plate Securing Holes | 34 |

-continued

| Drawing Reference Numerals | |
|---|---|
| Electric Light Securing Threads | 36 |
| Channel | 38 |
| Surrounding Rim | 40 |
| Lower Terminus | 42 |

DESCRIPTION OF EMBODIMENT

Figure 2:
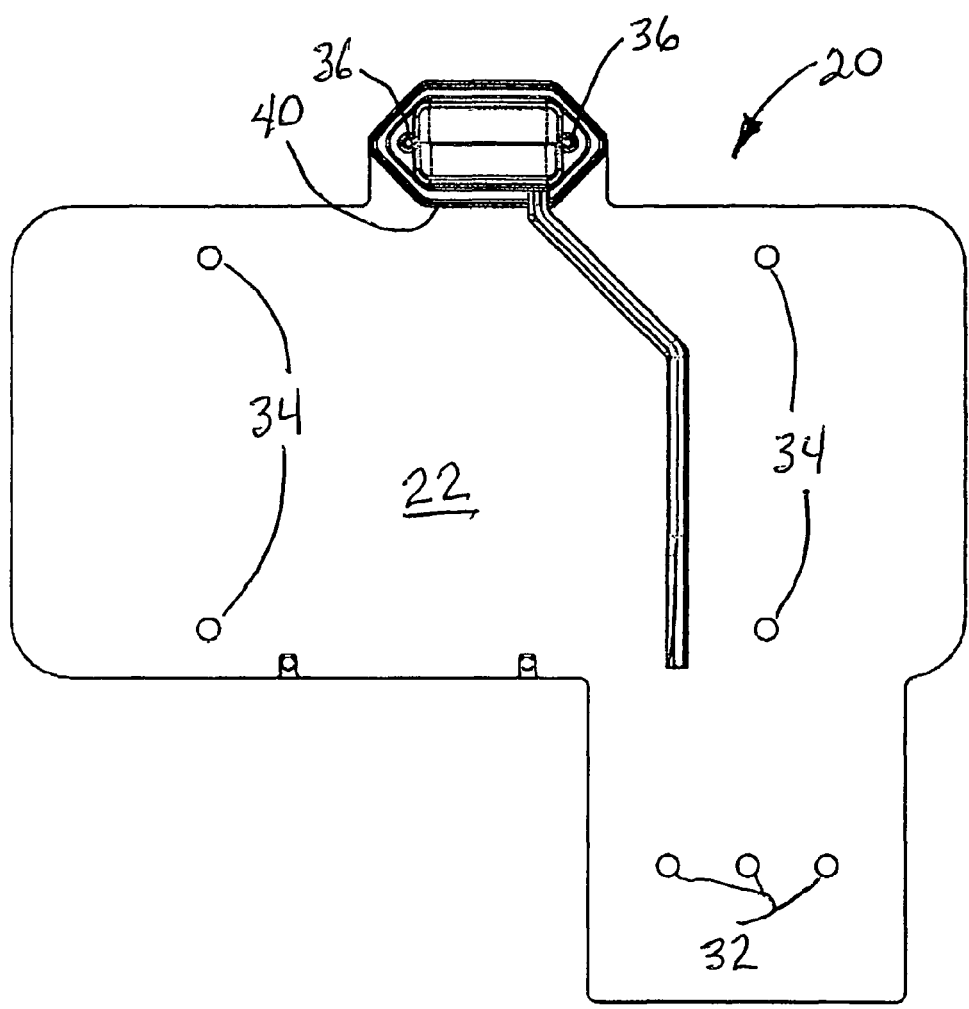
FIG. 2 is a front view of the first embodiment.

An embodiment of the license plate bracket is shown in FIGS. 1 and 2 generally at 20. Bracket 20 includes sheet 22, made from a single continuous sheet. It will be understood that the license plate bracket 20 of the present invention could be made of multiple sheets laminated together without departing from the scope of the invention.

Figure 3:
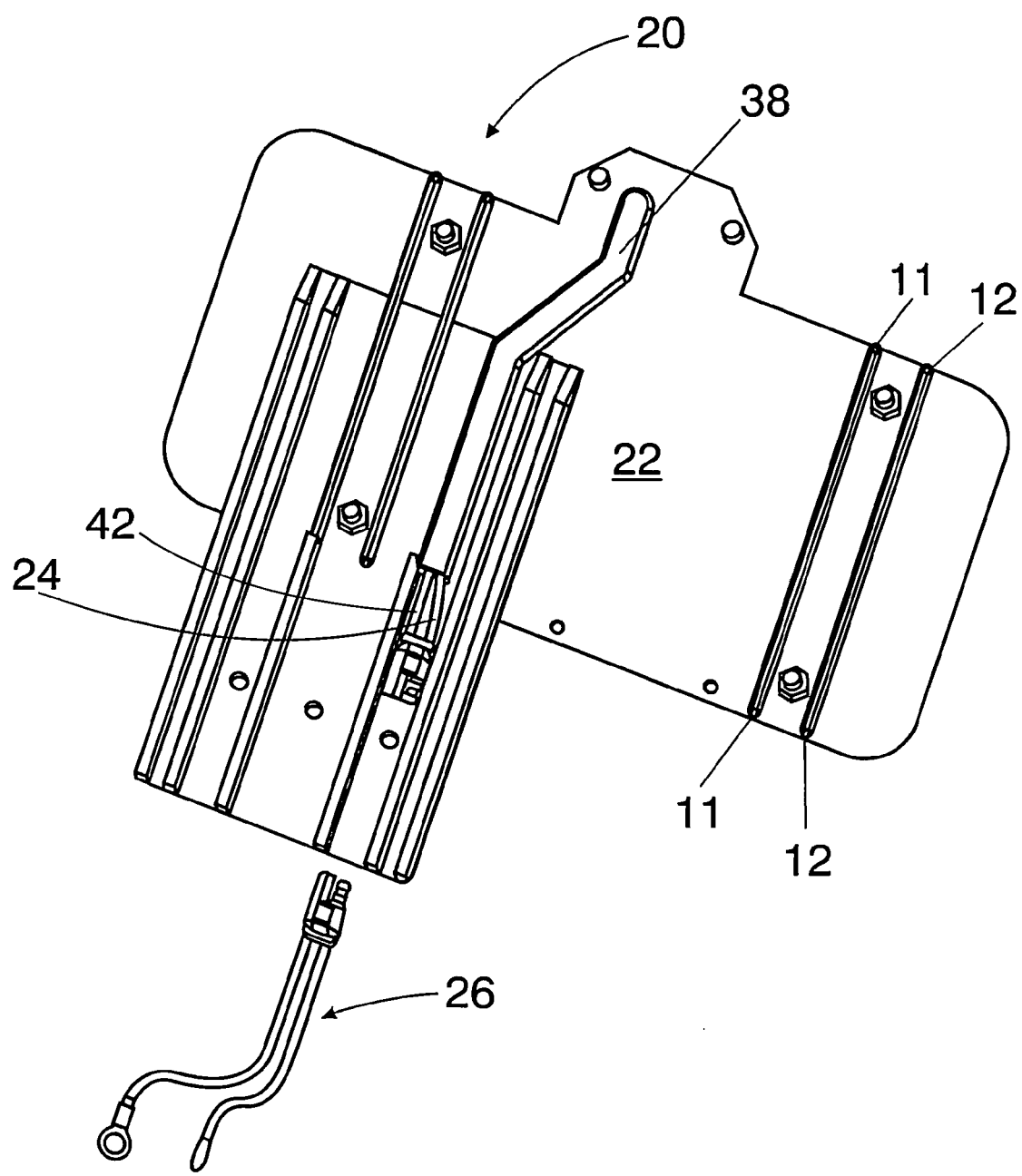
FIG. 3 is a perspective rear view of the first embodiment.

Four license plate securing holes 34 in sheet 22 are positioned to correspond spatially with the holes in license plate 13 (see FIG. 4), thereby allowing the license plate to be secured to bracket 20 through bolts 11 and nuts 12, as shown in FIG. 3.

Figure 4:
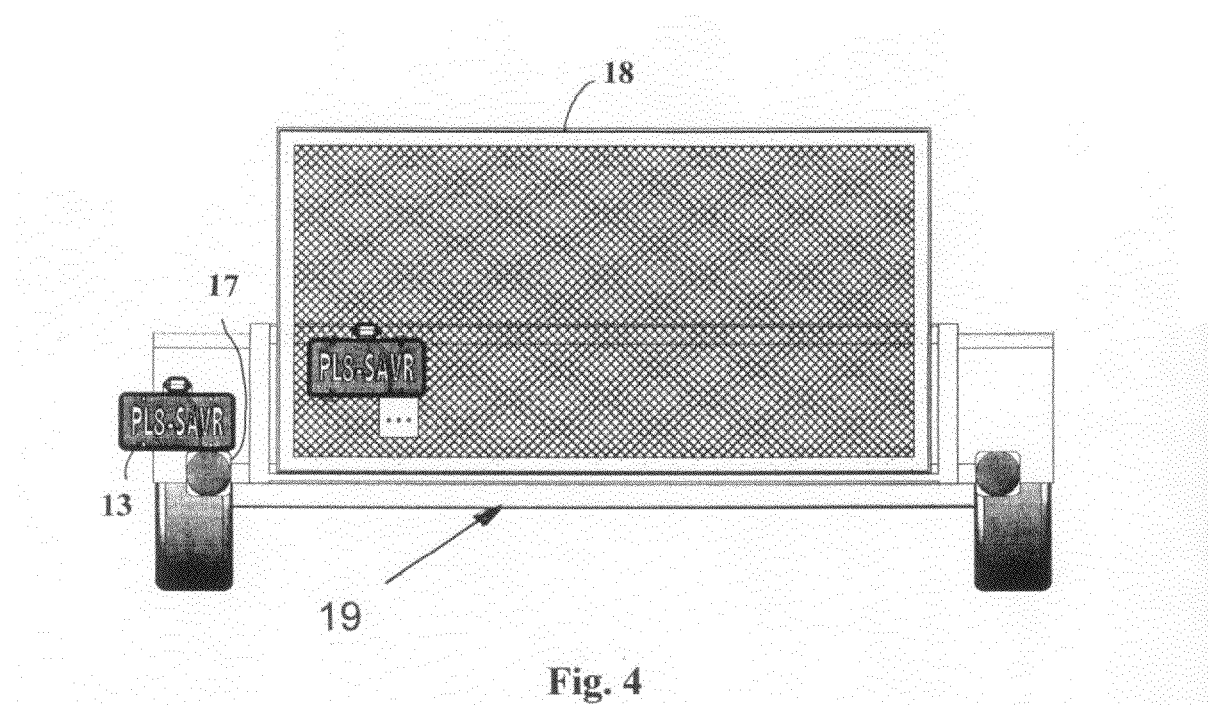
FIG. 4 is a schematic of the first embodiment shown in use in two different positions on a utility trailer.

Three tail light holder securing holes 32 in sheet 22 are positioned to correspond spatially with utility trailer tail light holder holes (not shown) in order to secure bracket 20 to tail light holder 17. Alternatively, the bolts 11 and nuts 12 securing license plate 13 to license plate securing holes 34 may be also used to secure bracket 20 directly to utility trailer gate 18. These two placement alternatives for bracket 20 are shown in FIG. 4.

As seen in FIGS. 1 and 3, first supporting ridges 28 run vertically on the rear face of sheet 22, thereby adding structural integrity to bracket 20. Tail light securing holes 32 are positioned between first supporting ridges 28, thereby protecting the securing means (such as bolts 11 and nuts 12) from being bumped loose when the bracket 20 is secured to a tail light holder 17, as seen in FIG. 4.

Second supporting ridges 30 run vertically on the rear face of sheet 22, thereby adding structural integrity to bracket 20. License plate securing holes 34 are positioned between second supporting ridges 30, thereby protecting the bolts 11 and nuts 12 from being bumped loose when bracket 20 is secured to a license plate and/or back gate of a utility trailer.

Two electric light securing threads 36 and a surrounding rim 40 are positioned at the top of sheet 22, thereby allowing electric light 14 to be secured and centered at the top of sheet 22. As seen in FIGS. 1, 2, 3, and 5, channel 38 runs from the bottom to the top of sheet 22, with the top end of channel 38 terminating near electric light securing threads 36 thereby allowing electric light 14 to have attached electric cord 15 running down channel 38, with quick disconnect adapter 24 being positioned below channel 38 lower terminus 42.

Figure 5:
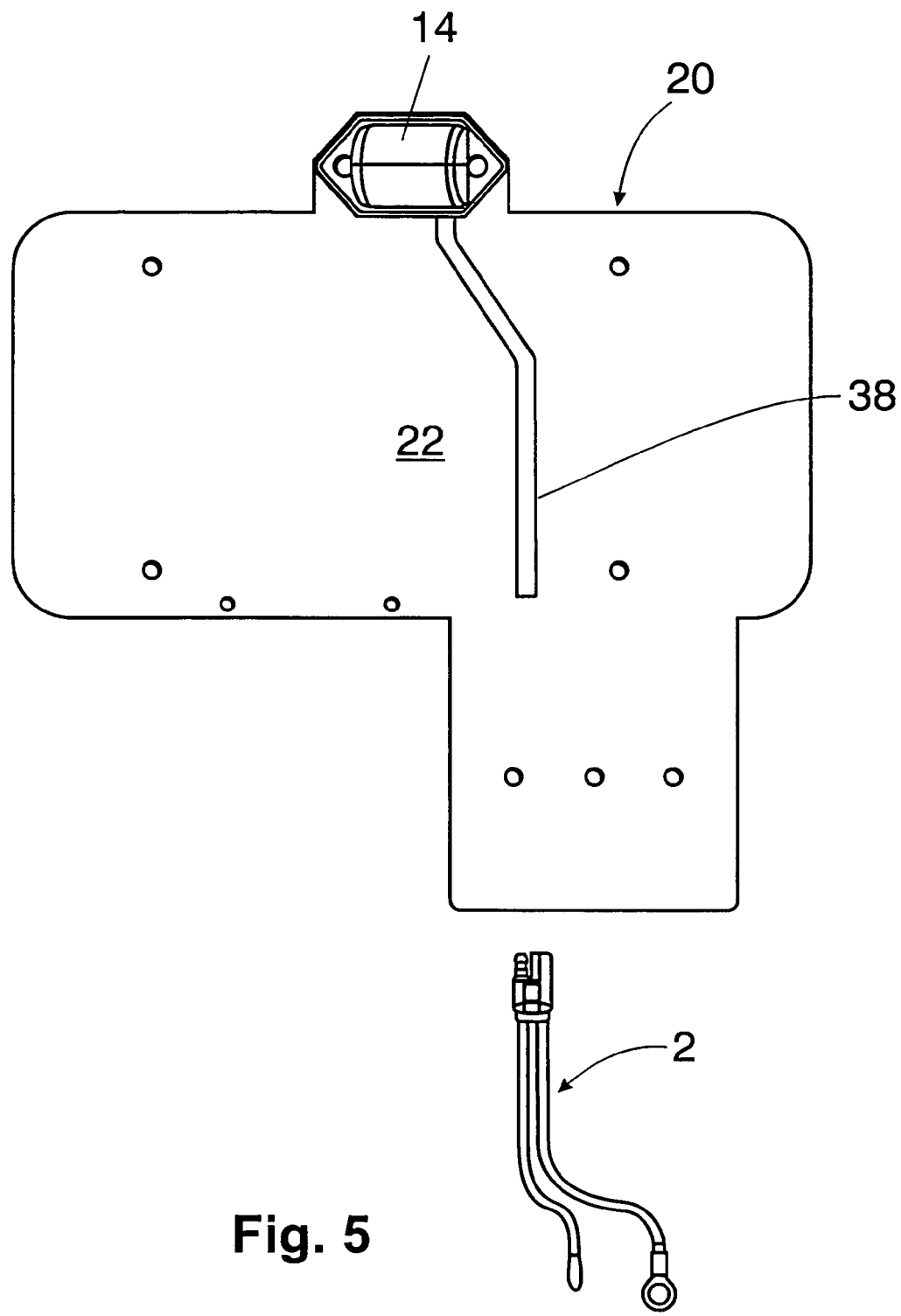
FIG. 5 is a perspective front view of the first embodiment.

As seen in FIG. 5, channel 38 is hollow on the front face of the sheet 22, thereby allowing electric cord 15 to be placed easily in channel 38 but be protected when a license plate 13 is attached to the front face of sheet 22.

FIG. 4. shows two possible positions of electric light 14 when bracket 20 is secured to utility trailer 19. Electrical extender 26 will be attached to quick disconnect adapter 24 (FIG. 3) when the bracket is utilized to mount the license plate on the tail light holder 17 to allow the electrical connection to be made to the socket in the tail light holder 17 or with a longer version of extender 26 (not shown) when bracket 20 is mounted in the alternate position to the rear of the gate 18.

Various changes, alternatives and modifications will become apparent to one of ordinary skill in the art following a reading of the foregoing specification. For example, while the material choice for the bracket is specified as "rigid material", it will be understood that for applications in which bracket 20 is to be mounted only on the tail gate, semi-rigid material would suffice. Aluminum and sheet metal are examples of rigid material and thermoplastics are examples of semi-rigid materials. It is intended that any such changes, alternatives and modifications as fall within the scope of the appended claims be considered part of the present invention.

I claim:

1. A bracket for mounting a license plate to a utility trailer, comprising:
   a. at least one generally rectangular sheet of rigid material having a first length and a first height, said generally rectangular sheet of material having a rectangular extension with a second length substantially less than said first length protruding from a bottom portion of said generally rectangular sheet adjacent a first edge thereof;
   b. means to secure said at least one sheet of rigid material to a tail light holder of the utility trailer, said means to secure being located in said rectangular extension; and
   c. means to secure the license plate to said at least one sheet of rigid material, wherein the lowest horizontal edge of the license plate is positioned above the top horizontal edge of the tail light holder.

2. The bracket of claim 1 wherein said means to secure said at least one sheet of rigid material to the tail light holder comprises a first plurality of bracket holes which correspond spatially with a plurality of holes or bolts in the tail light holder, fastener means extending through said first plurality of bracket holes and the plurality of holes or bolts in the tail light holder.

3. The bracket of claim 1 where said means to secure said at least one sheet of rigid material to the license plate comprises a second plurality of bracket holes which correspond spatially with a plurality of holes in the license plate, fastener means extending through said second plurality of bracket holes and plurality of holes in the license plate.

4. The bracket of claim 1 wherein said at least one sheet of rigid material is a first sheet of rigid material and said first sheet of rigid material is secured to the tail light holder of the utility trailer, said first sheet of rigid material being approximately the size of a license plate.

5. The bracket of claim 1 further comprising at least one ridge of rigid material, wherein said at least one ridge of rigid material is approximately perpendicular to a rear face of said at least one sheet of rigid material and runs approximately vertically on said rear face of said at least one sheet of rigid material.

6. The bracket of claim 5 wherein said at least one ridge of rigid material comprises at least two ridges of rigid material, said at least two ridges of rigid material spaced at least as far apart as the width of an electric cable.

7. The bracket of claim 5 wherein said at least one ridge of rigid material comprises at least two ridges of rigid material, said at least two ridges of rigid material positioned on either side of said means to secure said sheet to the tail light holder of the utility trailer.

8. The bracket of claim 1 further comprising a means to secure an electric light to said at least one sheet of rigid material, whereby the electric light is positioned above the license plate.

9. The bracket of claim 8 wherein said at least one sheet of rigid material further comprises a recessed channel for an electric cord, one end of said recessed channel terminating near said means to secure an electric light.

10. The bracket of claim 8 wherein said at least one sheet of rigid material further comprises a channel formed in said at least one sheet of rigid material, one open end of said channel terminating near said means to secure an electric light.

11. A bracket for mounting a license plate to a utility trailer, comprising:
   a. at least one generally rectangular sheet having a first length and a first height, said generally rectangular sheet of material having a rectangular extension with a second length substantially less than said first length protruding from a bottom portion of said generally rectangular sheet adjacent a first edge thereof, said at least one sheet manufactured from a material selected from a group of materials consisting of rigid materials and semi-rigid materials;
   b. means to secure said at least one sheet alternatively in a first position adjacent to a tail light holder of the utility trailer and a second position secured to the back gate of the utility trailer, said means to secure being located in said rectangular extension;
   c. means to secure the license plate to said at least one sheet;
   d. means to secure an electric light to said at least one sheet; and,
   e. alternative electrical connectors allowing engagement with an electrical socket associated with said tail light holder in both said first position and said second position;
wherein the electric light is positioned approximately above the top edge of the license plate.

12. The bracket of claim 11 further comprising at least one ridge, said at least one ridge manufactured from a group of materials consisting of rigid materials and semi-rigid materials, wherein said at least one ridge is approximately perpendicular to the face of said at least one sheet and runs approximately vertically on the face of said at least one sheet.

13. The bracket of claim 12 wherein said at least one ridge comprises at least two ridges, said at least two ridges spaced at least as far apart as the width of an electric cable.

14. The bracket of claim 12 wherein said at least one ridge comprises at least two ridges, said at least two ridges positioned on either side of said means to secure said sheet to the back gate of the utility trailer and said means to secure the license plate to said at least one sheet.

15. The bracket of claim 11 wherein said at least one sheet further comprises a recessed channel for an electric cord, one end of said recessed channel terminating near said means to secure an electric light.

16. The bracket of claim 11 wherein said at least one sheet further comprises a channel formed in said at least one sheet, one open end of said channel terminating near said means to secure an electric light.

17. A bracket for mounting a license plate to a utility trailer, comprising:
   a. at least one sheet of rigid material having a first length and a first height, said generally rectangular sheet of material having a rectangular extension with a second length substantially less than said first length protruding from a bottom portion of said generally rectangular sheet adjacent a first edge thereof
   b. means to secure said at least one sheet of rigid material to the back gate of the utility trailer, and means alternatively to secure said at least one sheet of rigid material to a tail light holder of the utility trailer;
   c. means to secure the license plate to said at least one sheet of rigid material, said means to secure being located in said rectangular extension, wherein the lowest horizontal edge of the license plate is positioned above the top horizontal edge of the tail light holder; and
   d. means to secure an electric light to said at least one sheet of rigid material, wherein the electric light is positioned approximately above the top edge of the license plate.

18. The bracket of claim 17 wherein said at least one sheet of rigid material further comprises a recessed channel for an electric cord, one end of said recessed channel terminating near said means to secure an electric light.

19. The bracket of claim 17 wherein said at least on sheet of rigid material further comprises a channel formed in said at least one sheet of rigid material, one open end of said channel terminating near said means to secure an electric light.

20. The bracket of claim 17 further comprising a quick disconnect adapter and an electrical extender connectable thereto allowing electrical connection to the tail light holder when said bracket is mounted on the back gate of the utility trailer.

* * * * *